United States Patent
Levin et al.

(10) Patent No.: US 12,467,693 B1
(45) Date of Patent: Nov. 11, 2025

(54) DRY COOLING TOWER

(71) Applicants: Alexander Levin, Binyamina (IL); Hanan-Emanuel Levin, Binyamina (IL)

(72) Inventors: Alexander Levin, Binyamina (IL); Hanan-Emanuel Levin, Binyamina (IL)

( * ) Notice: Subject to any disclaimer, the term of this patent is extended or adjusted under 35 U.S.C. 154(b) by 69 days.

(21) Appl. No.: 18/957,937

(22) Filed: Nov. 25, 2024

(51) Int. Cl.
- *F28D 1/03* (2006.01)
- *F28D 1/02* (2006.01)
- *F28F 9/007* (2006.01)
- *F28F 21/06* (2006.01)

(52) U.S. Cl.
CPC ........... *F28D 1/035* (2013.01); *F28D 1/0233* (2013.01); *F28F 9/0075* (2013.01); *F28F 21/065* (2013.01); *F28D 2001/0266* (2013.01)

(58) Field of Classification Search
CPC ... F28F 3/14; F28F 3/12; F28F 9/0075; F28D 1/035; F28D 1/0233
See application file for complete search history.

(56) References Cited

U.S. PATENT DOCUMENTS

| | | | | |
|---|---|---|---|---|
| 4,216,820 A * | 8/1980 | Andrew | ................... | F28D 5/02 165/110 |
| 4,411,310 A * | 10/1983 | Perry | ................... | B29C 66/438 165/DIG. 183 |
| 4,511,436 A * | 4/1985 | el Din Nasser | ........... | F28D 3/00 159/17.1 |
| 4,696,135 A * | 9/1987 | Kallinger | ................ | E04H 12/34 249/20 |
| 4,859,265 A * | 8/1989 | Shuster | ............. | B29C 66/73772 156/289 |
| 4,871,017 A * | 10/1989 | Cesaroni | ................. | F28D 1/035 165/170 |
| 4,893,669 A * | 1/1990 | Kashiwada | ............... | F28C 1/04 261/153 |
| 4,907,648 A * | 3/1990 | Emmerich | ............... | B27N 5/02 165/DIG. 384 |
| 5,320,168 A * | 6/1994 | Haight | ....................... | B01J 8/12 165/166 |
| 5,904,807 A * | 5/1999 | Ramm-Schmidt | .... | F28F 9/0275 159/43.1 |
| 6,289,977 B1 * | 9/2001 | Claudel | ................. | F28D 9/0031 165/157 |
| 9,372,033 B2 * | 6/2016 | Ramm-Schmidt | .... | F28F 21/065 |
| 11,173,575 B2 * | 11/2021 | Rutkowski | ............ | F28F 21/065 |
| 2010/0139900 A1 * | 6/2010 | Thompson | ............ | F28D 9/0043 165/166 |

(Continued)

FOREIGN PATENT DOCUMENTS

DE    1259362 B * 1/1968
EP    0052321 A1 * 5/1982

*Primary Examiner* — Paul Alvare

(57) ABSTRACT

The invention relates to a dry cooling tower that replaces traditional metal finned tubes with rectangular polymer bags. Three spacers are positioned between adjacent polymer bags to restrict buckling and minimize airflow resistance. This configuration enhances structural stability and improves heat dissipation while significantly reducing manufacturing costs compared to conventional designs. The design optimizes thermal performance while maintaining efficient cooling operation in industrial applications.

6 Claims, 12 Drawing Sheets

(56) References Cited

U.S. PATENT DOCUMENTS

| | | | |
|---|---|---|---|
| 2013/0146226 A1* | 6/2013 | Ramm-Schmidt | .............................. B29C 66/1122 165/104.19 |
| 2014/0246184 A1* | 9/2014 | Byman | ................... F28F 3/044 165/166 |
| 2020/0191492 A1* | 6/2020 | Liu | ........................... F28F 3/14 |
| 2021/0337700 A1* | 10/2021 | Jung | ...................... H10K 50/87 |
| 2022/0263153 A1* | 8/2022 | Gorzellik | .......... H01M 10/6557 |
| 2023/0093710 A1* | 3/2023 | Cuadra | ..................... F28F 3/14 |
| 2023/0130589 A1* | 4/2023 | Sawafta | ................. F28F 27/02 165/10 |

* cited by examiner

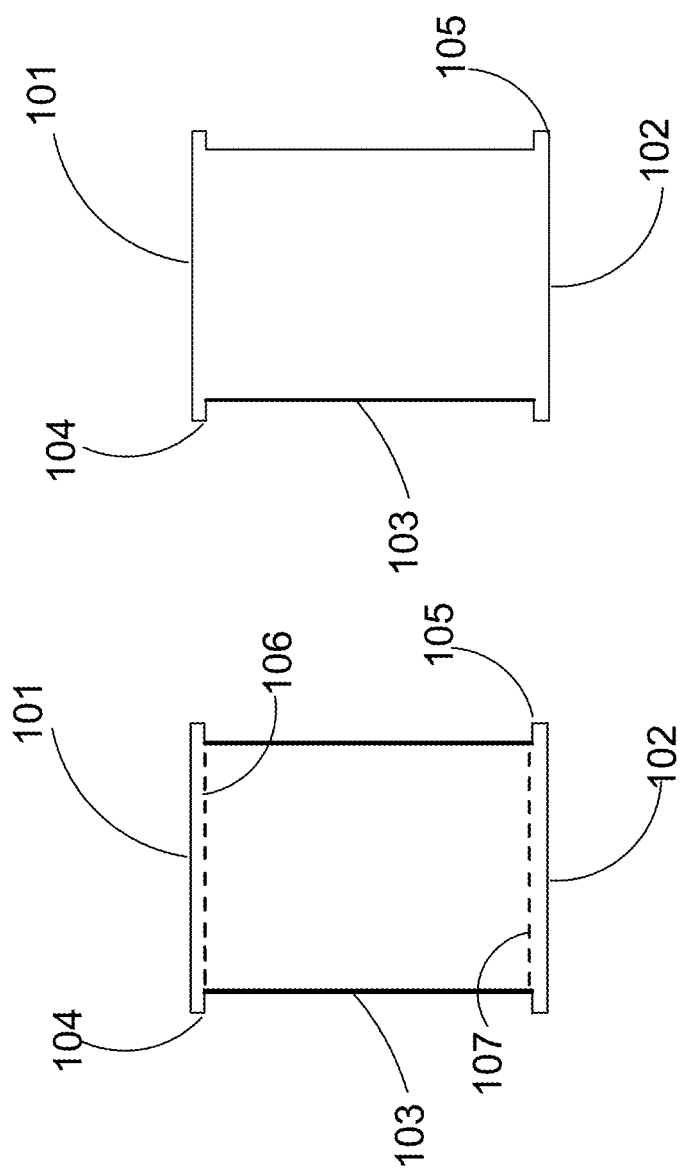

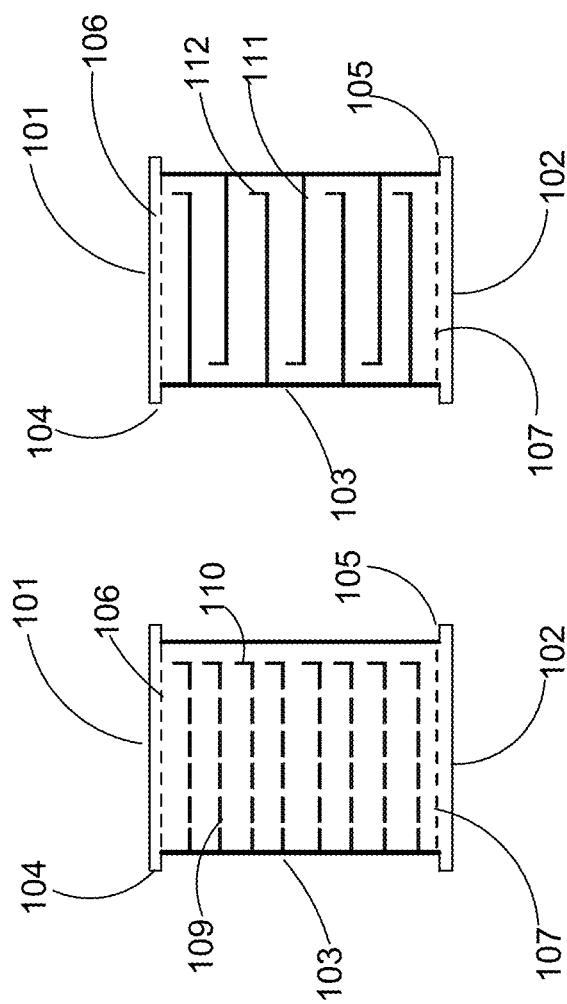

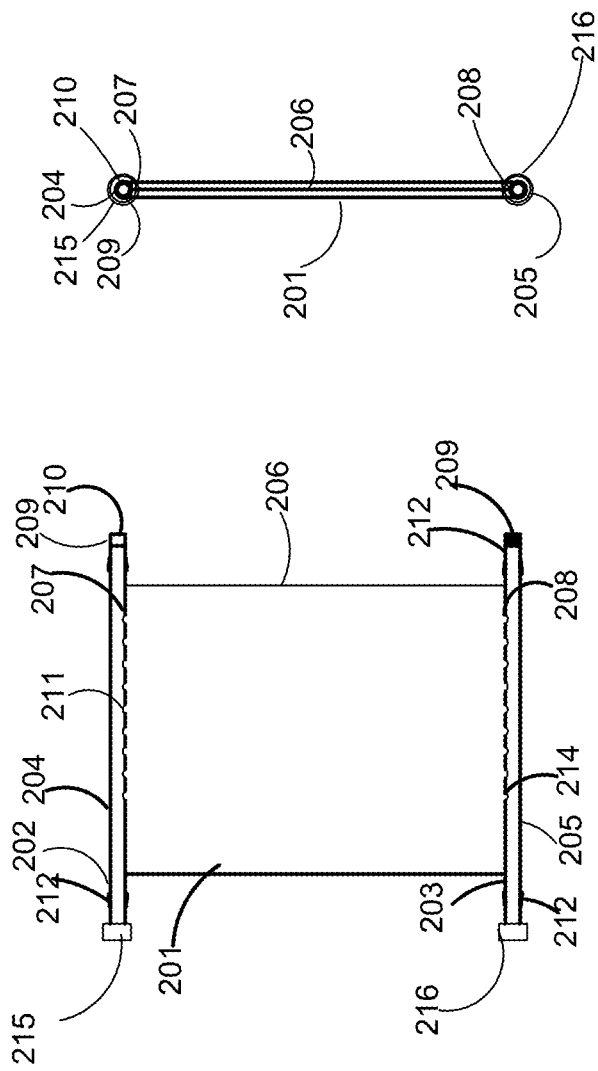

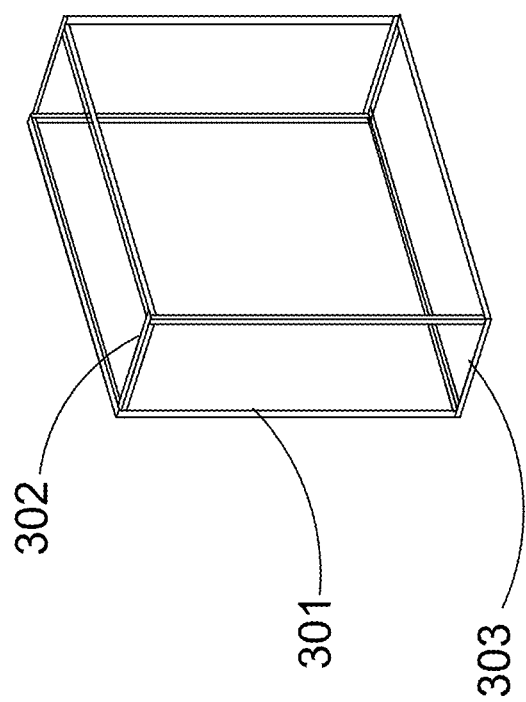

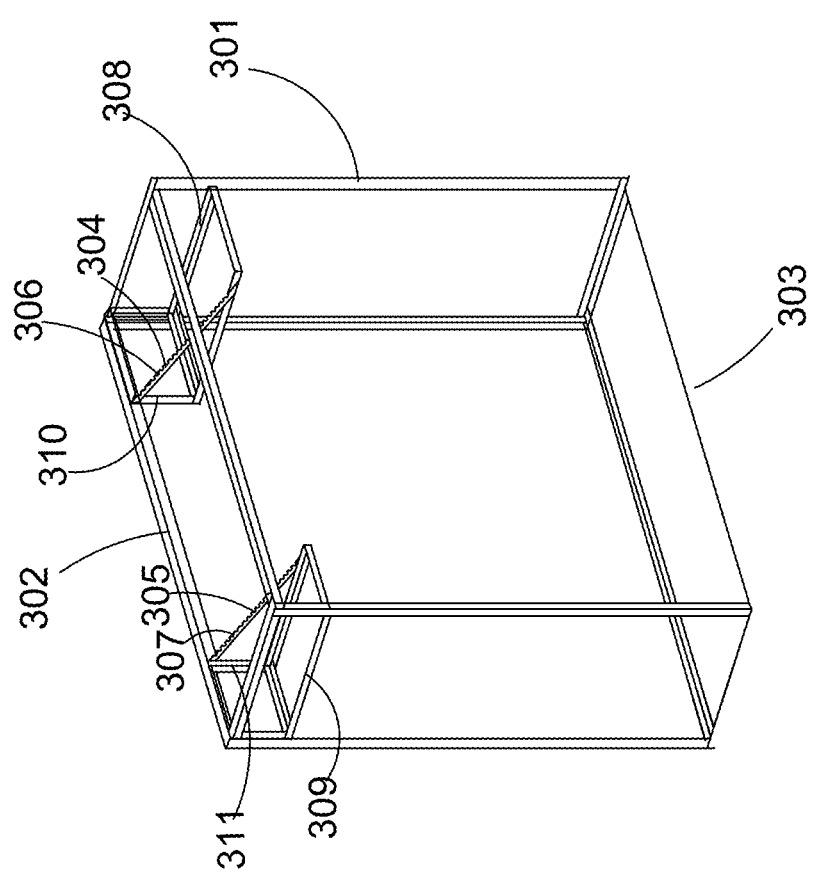

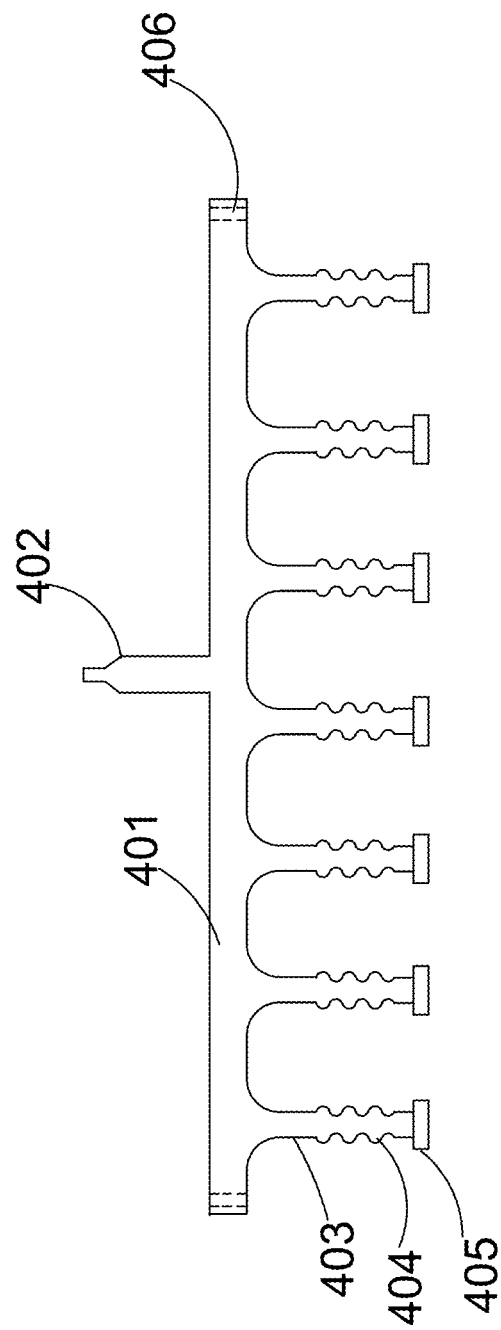

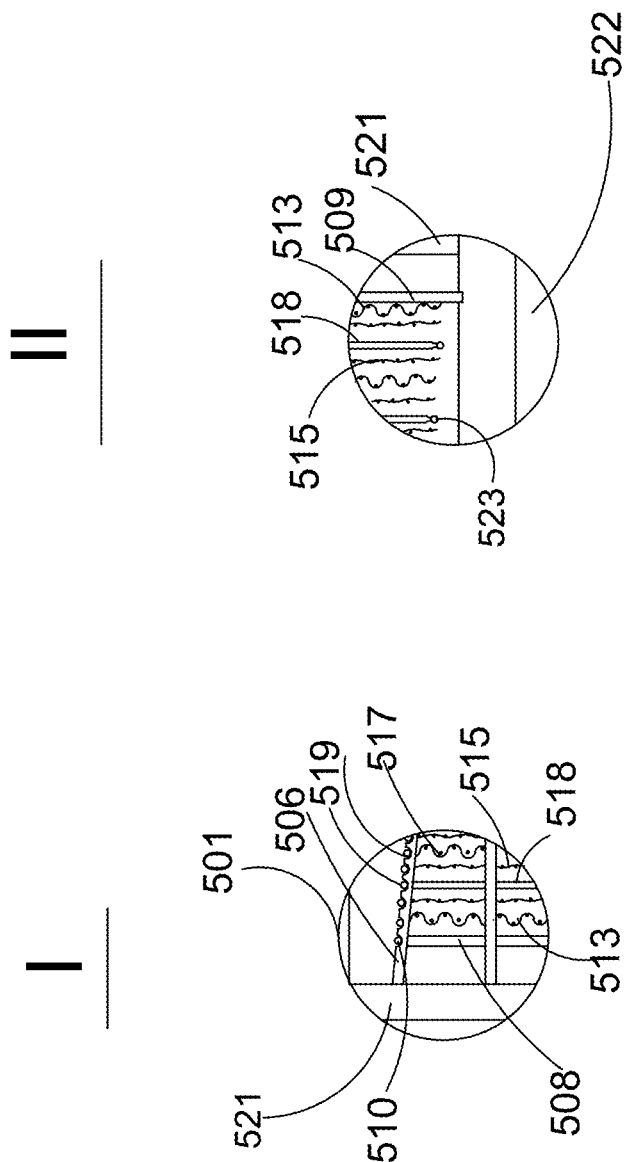

DRY COOLING TOWER

BACKGROUND OF THE INVENTION

This invention is related to the area of heat exchangers and specifically to dry cooling towers.

It is known that thermo-electric power plants, which use fossil fuels, nuclear fuel, or solar radiation, require cooling large volumes of recirculating water used for cooling steam condensers when the steam is exhausted from turbines.

Such problem is also relevant for water cooling of photoelectric panels used in areas with hot climates.

Wet cooling towers are used mostly in areas, where sources of natural cooling water are limited.

However, the use of wet cooling towers causes significant losses of fresh water.

Therefore, the use of dry cooling towers presents an attractive solution to this problem.

The main problem with the use of dry cooling towers is the cost of their air-cooled heat exchangers and the hydraulic resistance of these air-cooled heat exchangers.

It is known that the cost of heat exchangers contributes to the total costs of dry cooling towers, especially those operating with natural air draft.

This invention proposes the relatively inexpensive design of the dry cooling tower, which applies flexible materials such as polymer films, laminated polymer films, metal foils, or thin waterproof impregnated fabrics.

Patent EP0052321A1 describes a heat exchanger element of flexible material having an upper web and a lower web of plastic or coated fabric, the upper and lower webs being fixed at a defined distance apart and being directly and permanently connected to each other, continuously at their edges and at least intermittently and at predetermined intervals over their remaining surface.

Patent DE1259362B describes a heat exchanger for at least two fluids with a housing in which several plate-like heat exchange walls are arranged, which consist of slightly flexible plastic films, with means being provided to keep the heat exchange walls at a distance from one another even with different pressures of the heat exchanging fluids, characterized in that the film walls are combined at the edge by closed circumferential connections to form inflated element pairs through which a heat-exchanging fluid flows and the two film walls of each element pair within their closed circumferential connection) are additionally connected to one another in such a way that they result in a flat, hollow-plate-like element pair in the inflated state.

U.S. Pat. No. 9,372,033 B2 describes a heat exchange element of flexible plastic film, a heat exchanger including such elements, and an apparatus for manufacturing the elements. The element includes a pair of opposite film sheets bonded by welds to form an expandable bag with inside and outside heat exchange surfaces, an inlet opening for supplying a pressurized heat exchange fluid to the bag, an outlet opening for discharging the fluid from the bag after heat exchange, and an array of welds defining routes for fluid flow inside the bag. There are spot welds in the first zone of the element, parallel extended welds in the second zone of the element, defining fluid flow channels through the second zone, and oblique welds in the third zone of the element, defining channels for fluid flow towards the outlet opening. The heat exchanger includes adjacent elements for heat exchange between a pressurized first fluid.

U.S. Pat. No. 4,411,310 describes a heat exchange apparatus made up of a plurality of sheets, desirably made of thin film plastic, bonded one to another to form a unitized heat exchange structure.

Alternate first pairs of sheets are bonded one to another along a first set of longitudinally extending bond lines positioned at first transverse locations along the width dimensions of the sheets. There is a second set of pairs of alternately spaced sheets (made up of adjacent sheets of adjoining first pairs of sheets) which are bonded one to another along a second set of longitudinally extending bond lines positioned transversely intermittent of the first set of longitudinal bond lines. These sheets are expanded from one another to form a plurality of diamond-shaped heat exchange passageways arranged in parallel rows. In the preferred form, each end of the heat exchange structure is bonded into a moulded base member, which in turn is connected to a related manifold structure. Each manifold structure has a pair of oppositely positioned manifold chambers leading to parallel alternately spaced feed passages, with each alternate set connecting to a related alternate set of heat exchange passageways.

U.S. Pat. No. 4,733,718 describes a heat exchanger or heat accumulator bodies which are simple to produce. The bodies consist of a stack of extruded hollow chamber panels with plane-smooth outer walls and webs that join the outer walls in a single piece. The hollow chamber panels are joined to one another in the stack on the front side by locking connections. The locking connections can be produced with an inserted electrical band heater, glue seams, or undercut interlockings. The hollow chamber panels are not joined to one another in the in-between areas or are not everywhere joined in the in-between areas.

U.S. Pat. No. 4,859,265 describes a process for the manufacture of a heat exchanger from a thermoplastic polymer, especially a polyamide, is disclosed. The heat exchanger comprises two generally planar panels formed from a composition of the polymer, bonded together to form a labyrinth of fluid passages between the panels that extend between inlet and outlet means. The labyrinth occupies a substantial proportion of the area of the panels.

U.S. Pat. No. 4,871,017 describes Inlet and outlet headers for a panel heat exchanger are disclosed. The headers are comprised of a distributor ring, which is located between the panels of the panel heat exchanger, an inlet distributor nipple, and a mating flange. The inlet distributor nipple is adapted to pass through the distributor ring and be attached in a fluid-tight fit by means of the mating flange. The panel heat exchanger, including the inlet and outlet headers, are fabricated from thermoplastic polymers. The panel heat exchangers may be used in a wide variety of end-uses, including automotive end-uses.

U.S. Pat. No. 4,907,648 describes a crosscurrent heat exchanger body made up of a stack of joined, parallel flow web plates, and a hollow chamber for flow across them between each two successive web plates, with the cover layers of successive web plates being sloped toward one another at their ends over the hollow chamber enclosed between them, and being joined tightly to one another over the entire width.

U.S. Pat. No. 11,173,575 describes a method of manufacturing a heat exchanger array that includes stacking a plurality of heat exchanger units in an aligned configuration with respective first ports of the heat exchanger units aligned. The heat exchanger units can include a first and second sheet coupled together to define a cavity between the first and second sheets; the first port at the first end of the heat exchanger unit defined by the first and second sheets; and a second port at a second end of the heat exchanger unit defined by the first and second sheets. The method further includes stacking the plurality of heat exchanger units in an aligned configuration with the first ports of the plurality of heat exchanger units aligned and generating a first plurality of respective couplings between adjacent sheets of adjacent heat exchanger units about adjacent first ports. The coupling can be generated by an adhesive.

SUMMARY OF THE INVENTION

The dry cooling tower, which is proposed in this invention, comprises a plurality of flat plate heat-exchanging units arranged in parallel with spacers placed between them.

Each flat-plate heat-exchanging unit is designed as a rectangular bag, which is formed mainly from two identical rectangular pieces of polymer films (or laminated foil, double-sided laminated foil, waterproof impregnated fabric); these rectangular pieces are supposed to be placed preferably in a vertical plane; each rectangular piece is provided with two pairs of opposite upper and lower rectangular protrusions on their lateral sides, wherein these two rectangular pieces are overlapped and seamed by welding along their edges including their upper and lower protrusions and excluding the edges of these upper and lower protrusions, which are in parallel with the lateral sides of the rectangular polymer films. In addition, the upper section of the rectangular bag can be provided with a first horizontal seam, which is parallel to the upper horizontal seam and placed with a small deviation downward regarding the points of intersections of the vertical edges of the rectangular polymer films with the lower horizontal edges of the upper rectangular protrusions.

In such a way, the seam of the upper edges, the seams of the lower edges of the upper rectangular protrusions, and the first horizontal seam forms an upper duct, when the upper section of the rectangular bag is in its inflatable state.

This first seam has some unseamed gaps, which form openings in the inflatable state of the upper section of the rectangular bag.

This first duct serves for guiding a feeding pipe in the process of its insertion into the rectangular bag.

The lower section of the rectangular bag is provided with a second seam, which is parallel to the lower horizontal seam and placed with a small deviation upward regarding the points of intersections of the vertical edges of the rectangular polymer pieces with the upper horizontal edges of the lower rectangular protrusions.

This second seam has some unsewn gaps.

In such a way, the seam of the lower edges, the seams of the upper edges of the lower rectangular protrusions, and the second horizontal seam form a lower duct, when the lower section of the rectangular bag is in its inflatable state.

This second seam serves to guide a withdrawal pipe during its insertion into the rectangular bag.

In such a way, the rectangular pieces form a polymer bag with two ducts formed by the upper and lower pairs of the rectangular protrusions.

There are upper and lower feeding and withdrawal pipes, which are introduced into the upper and lower bag's ducts, and the length of the upper and lower pipes is chosen in such a manner that their terminal sections protrude outwards relative to the upper and lower ducts.

One end of the withdrawal pipe is sealingly closed by a lower plug. One end of the feeding pipe is sealingly closed too by the upper plug, however, in some cases, the position of the upper plug can be somewhat displaced toward the opposite open end.

The perimeters of the upper and lower pipes conform to twice the width of the upper and lower ducts; so, the upper and lower pipes are introduced into the upper and lower ducts with very small tolerance.

The walls of the upper and lower pipes are provided with sets of openings, and one end on each pipe is sealed. In the case of the displaced plug that was described above, the section of the feeding pipe between the plug and the opposite end, which is in fluid connection with the atmosphere, is provided with some openings in its wall. The open feeding end of the feeding pipe and the open end of the withdrawal pipe are joined with parts of the demountable coupling units.

The upper and lower ducts are joined with the upper and lower pipes by sealing cuffs.

The internal space of the obtained rectangular bag is filled with a heat transfer fluid, in most cases, with water flowing downwards and existing via the lower pipe.

In a case, where the rectangular bag has a large vertical length it is important to limit hydrostatic pressure at the lower section of the rectangular bag.

In order to do it, there is a set of additional horizontal intermittent seams fabricated in the rectangular bag; each additional horizontal seam is intersected with one alternative vertical lateral seam and has a gap with respect to the opposite vertical lateral seam.

The end of the additional horizontal seam, which is not intersected with the lateral vertical seam, is intersected with a short vertical seam having a gap with its upper horizontal additional seam.

In such a way, the horizontal additional seams, combined with their vertical lateral seams and the additional short vertical seams, form in their inflated state open channels.

In another version, there are additional short vertical seams that are arranged with gaps relative to the one vertical seam and intersected with horizontal additional seams, which are provided with some unseamed places that form several openings.

In both these versions, the plug that seals the upper pipe is arranged between the opposite ends of this upper pipe.

In order to achieve an even flow of water in these channels, there are short vertical seams or horizontal additional seams that can be provided with some unseamed places that form in the inflatable state of the rectangular bag some openings.

The terminal sections of the upper pipe serve for hanging the rectangular bag in the carcass of the dry cooling tower.

This carcass is designed as a rectangular parallelepiped fabricated from metal profiles.

Two supporting consoles are installed in the upper section of the carcass near its two opposite sides and in parallel with the plane of these opposite sides.

Each supporting console comprises a sloped or horizontal profile with a set of vertical recesses.

These recesses serve for supporting and hanging the following elements: restricting plates with upper crossbars; the restricting plates extending beyond the dimensions of the rectangular bags installed in this carcass; the restricting plates have openings positioned at the periphery of the plate to enable bolted connection using bolts and nuts; a corrugated fence netting with an upper crossbar; a fine netting or a thin metal sheet with upper crossbars; the rectangular bag, which was described above.

Further elements in this dry cooling tower are combinations of the following four units: a thin planar member with a rectangular shape and a crossbar joined with its upper edge, wherein this thin planar member can be realized as the fine netting with its crossbar or the thin metal sheet with its crossbar; the corrugated fence netting with its crossbar; the fine netting or the thin metal sheet with its crossbar; the rectangular bag, which is hung on the terminal sections of its upper pipe.

The sequence of these four elements is terminated near the opposite lateral side of the metal carcass by the fine netting or the thin metal sheet with its crossbar, the corrugated fence netting with its crossbar, and the restricting plate with an upper crossbar; the restricting plate extending beyond the dimensions of all rectangular bags installed in this metal carcass. The restricting plate has openings positioned at the periphery of the plate to enable bolted connection using bolts and nuts.

Two opposite restricting plates are joined by bolts via the openings at their brims.

In such a way, the corrugated fence nettings in this construction serve as spacers, which ensure the required spaces for natural or forced air drift via the dry cooling tower, and the fine nettings or thin metal sheets restrict the buckling of the rectangular bags into the spaces between them.

The open ends of the feeding and withdrawal pipes are coupled by the demountable coupling units to header tubes, which comprise inlet or outlet connections with several pipe branches arranged transversally to the header tube and joined at their distal ends with bellows, which are terminated by the coupling units. These bellows facilitate coupling the feeding or withdrawal header tubes with the feeding or withdrawal pipes of the dry cooling tower.

The lateral sides of the metal carcass, which are perpendicular to the planes of the flexible bags, can be closed with rectangular sheets. The upper or lower sides of the metal carcass can be provided with a fan for the forced flow of the cooling air via the dry cooling tower.

In addition, two opposite lateral sides of the metal carcass, which are perpendicular to the planes of the hanging rectangular bags, can be covered with sheets.

BRIEF DESCRIPTION OF THE SEVERAL VIEWS OF THE DRAWING

FIG. 1A is a front view of a rectangular sheet of a polymer film with two opposite rectangular upper protrusions and two opposite rectangular lower protrusions.

FIG. 1B is a front view of a flexible bag fabricated by seaming two rectangular polymer sheets shown in FIG. 1A.

FIG. 1C is a front view of a flexible bag fabricated by seaming two rectangular polymer sheets shown in FIG. 1A with vertical seams and additional intermittent horizontal seams.

FIG. 1D is a front view of a flexible bag fabricated by seaming two rectangular polymer sheets shown in FIG. 1A with additional vertical intermittent seams and additional horizontal seams.

FIG. 2A shows a front view of the flexible bag shown in FIG. 1B, which is provided with inserted upper and lower pipes.

FIG. 2B shows a lateral view of the flexible bag shown in FIG. 1B, which is provided with the inserted upper and lower pipes.

FIG. 3A shows an isometric view of a carcass, which serves for the installation of the flexible bags with their upper and lower pipes.

FIG. 3D is an isometric view of the carcass according to FIG. 3A with two supporting members shown in FIG. 3B and FIG. 3C.

FIG. 4 shows a manifold in fluid communication with the upper or lower pipes placed in the flexible bags installed in the carcass.

FIG. 5D and FIG. 5E are upper and lower detail sections (I and II) of the lateral view of the dry cooling tower.

DETAILED DESCRIPTION OF THE INVENTION

Figure 2C:
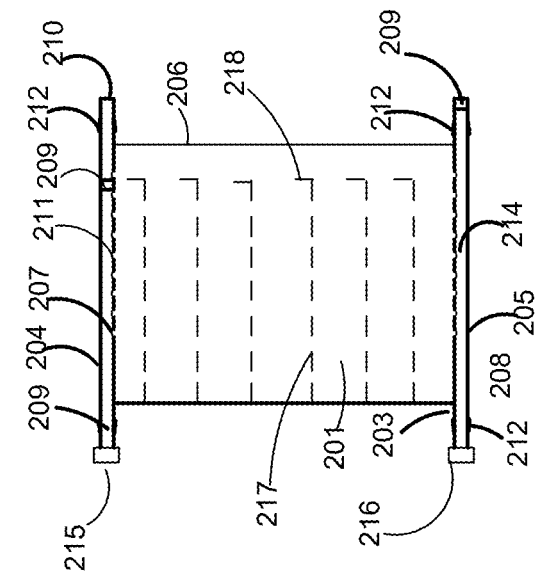
FIG. 2C shows a front view of the flexible bag shown in FIG. 1B that is provided by the inserted upper and lower pipes and additional horizontal intermittent seams with additional short vertical seams.

FIG. 1A is a front view of a rectangular sheet of a polymer film with two opposite rectangular upper protrusions and two opposite rectangular lower protrusions.

It comprises a rectangular sheet 101 made of flexible polymer films with upper rectangular protrusions 102 and lower rectangular protrusions 103.

FIG. 1B is a front view of a flexible bag fabricated by seaming two rectangular polymer sheets shown in FIG. 1A.

It comprises two rectangular sheets 101 made of flexible polymer films with upper rectangular protrusions 102 and lower rectangular protrusions 103, wherein these rectangular sheets with their rectangular protrusions are overlapped.

The overlapped rectangular sheets are joined by seams 104 and 105 at their upper and lower horizontal edges, by seams 106 at their vertical edges, and by an additional intermittent upper horizontal seam 107 on the lower horizontal edges on the upper rectangular protrusions 102 and a horizontal seam 108 on the upper horizontal edges of the lower rectangular protrusions 103.

FIG. 1C is a front view of a flexible bag fabricated by seaming two rectangular polymer sheets shown in FIG. 1B with additional vertical seams and additional intermittent horizontal seams.

It comprises two rectangular sheets 101 made of flexible polymer films with upper rectangular protrusions 102 and lower rectangular protrusions 103, wherein these rectangular sheets with their rectangular protrusions are overlapped.

The overlapped rectangular sheets are joined by seams 104 and 105 at their upper and lower horizontal edges, by seams 106 at their vertical edges, and by an additional intermittent upper horizontal seam 107 on the lower horizontal edges of the upper rectangular protrusions 102 and a horizontal seam 108 on the upper horizontal edges on the lower rectangular protrusions 103.

There is a set of additional horizontal intermittent seams 109 fabricated in the rectangular bag; each additional horizontal seam is intersected with one vertical lateral seam 106 and has a gap with respect to the opposite vertical lateral seam 106. The end of the additional horizontal seam 109, which is not intersected with the lateral vertical seam 106, is intersected with a short vertical seam 110 having a gap with its upper horizontal additional seam 109.

FIG. 1D is a front view of a flexible bag fabricated by seaming two rectangular polymer sheets shown in FIG. 1A with additional vertical intermittent seams and additional horizontal seams.

It comprises two rectangular sheets 101 made of flexible polymer films with upper rectangular protrusions 102 and lower rectangular protrusions 103, wherein these rectangular sheets with their rectangular protrusions are overlapped.

The overlapped rectangular sheets are joined by seams 104 and 105 at their upper and lower horizontal edges, by seams 106 at their vertical edges, and by additional intermittent upper horizontal seam 107 of the lower horizontal edges of the upper rectangular protrusions 102 and a horizontal seam 108 of the upper horizontal edges of the lower rectangular protrusions 103.

There is a set of additional horizontal seams 111 fabricated in the rectangular bag; each additional horizontal seam is intersected alternately with one vertical lateral seam 106 and has a gap with respect to the opposite vertical lateral seam 106. The end of the additional horizontal seam 111, which is not intersected with the lateral vertical seam 106, is intersected with a short vertical seam 112 that has a gap relative to its upper horizontal additional seam 111. The short vertical seams 112 can be of intermittent shape.

FIG. 2A, FIG. 2B and FIG. 2C shows a front view of the flexible bags shown in FIG. 1B, FIG. 1C and FIG. 1D, where they are provided with pipes inserted in upper and lower channels formed by upper and lower horizontal seams.

FIG. 2A shows two rectangular sheets 201 from flexible polymer films with upper rectangular protrusions 202 and lower rectangular protrusions 203, wherein these rectangular sheets with their rectangular protrusions are overlapped.

The overlapped rectangular sheets are joined by seams 204 and 205 at their upper and lower horizontal edges, by seams 206 at their vertical edges, and by additional intermittent upper and lower horizontal seams 207, and 208 of the lower horizontal edges of the upper rectangular protrusions 202 and the upper horizontal edges of the lower rectangular protrusions 203.

An upper inserted pipe 210 is provided with openings 211 in its wall and is sealingly closed by plug 209 at its one end. Channels formed by the upper rectangular protrusions 202 are sealingly joined by cuffs 212 around the terminal sections of pipe 210.

A lower inserted pipe 213 is provided with openings 214 in its wall and is sealingly closed by plug 209 at its one end. Channels formed by the lower rectangular protrusions 203 are sealingly joined by cuffs 212 to the terminal sections of pipe 213. The unplugged ends of pipes 210 and 213 are provided with coupling members 215 and 216.

FIG. 2B shows a lateral view of the flexible bag shown in FIG. 1B, which is provided by the inserted upper and lower pipes.

FIG. 2C shows a front view of the flexible bag shown in FIG. 1B, which is provided with the inserted upper and lower pipes and additional horizontal intermittent seams along with additional short vertical seams.

FIG. 2C comprises two rectangular sheets 201 from flexible polymer films with upper rectangular protrusions 202 and lower rectangular protrusions 203, which overlap with these rectangular sheets through their rectangular protrusions.

The overlapped rectangular sheets are joined by seams 204 and 205 at their upper and lower horizontal edges, by seams 206 at their vertical edges, and by additional intermittent upper and lower horizontal seams 207, and by horizontal seams 208 of the lower horizontal edges of the upper rectangular protrusions 202 and horizontal seams 209 of the upper horizontal edges of the lower rectangular protrusions 203.

There are the upper inserted pipe 210 that is sealingly closed by plug 209 placed between two ends of the pipe 210.

One end of pipe 210 and one end of pipe 213 are provided with coupling members 215 and 216.

An upper inserted pipe 210 is provided with openings 211 in its wall. Channels formed by the upper rectangular protrusions 202 are sealingly joined with cuffs 213 to the terminal sections of pipe 210.

A lower inserted pipe 213 is provided with openings 214 in its wall and is sealingly closed by a plug 209 at one end. Channels formed by the lower rectangular protrusions 203 are sealingly joined by cuffs 212 with the terminal sections of pipe 213. The unplugged ends of pipes 210 and 213 are provided with coupling members 215 and 216.

There is a set of additional horizontal seams 217 fabricated in the rectangular bag; each additional horizontal seam intersects with one vertical lateral seam 206 and has a gap relative to the opposite vertical lateral seam 206. The end of the additional horizontal seam 217, which is not intersected with the lateral vertical seam 206, is intersected with a short intermittent vertical seam 218 having a gap with its upper horizontal additional seam 217.

The short vertical seams 218 are of intermittent shapes.

Figure 2D:
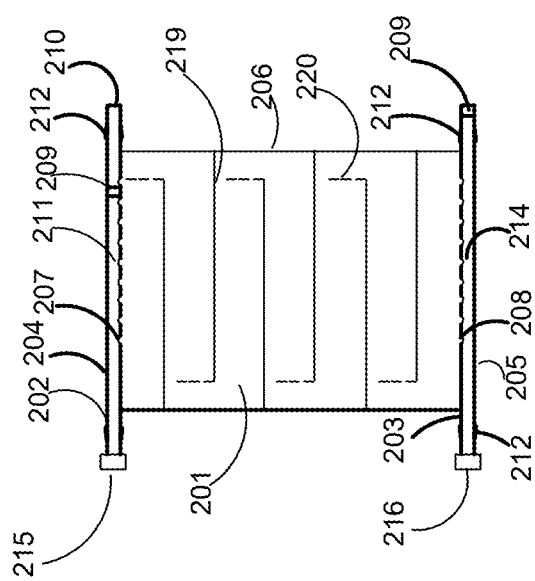
FIG. 2D shows a front view of the flexible bag shown in FIG. 1B, which is provided by the inserted upper and lower pipes and additional horizontal seams, which are alternately intersected with two opposite vertical seams, and with additional short vertical intermittent seams.

FIG. 2D comprises two rectangular sheets 201 from flexible polymer films with upper rectangular protrusions 202 and lower rectangular protrusions 203, which overlap these rectangular sheets with their rectangular protrusions.

The overlapped rectangular sheets are joined by seams 204 and 205 at their upper and lower horizontal edges, by seams 206 at their vertical edges, and by additional intermittent upper and lower horizontal seams 207, and by horizontal seams 208 of the lower horizontal edges of the upper rectangular protrusions 202 and horizontal seams 209 of the upper horizontal edges of the lower rectangular protrusions 203.

An upper inserted pipe 210 is provided with openings 211 in its wall and is sealingly closed by a plug 212 at one end. Channels formed by the upper rectangular protrusions 202 are sealingly joined by cuffs 213 with the terminal sections of pipe 210.

A lower inserted pipe 213 is provided with openings 214 in its wall and is sealingly closed by a plug 209 at one end. Channels formed by the lower rectangular protrusions 203 are sealingly joined by cuffs 212 with the terminal sections of pipe 213. The unplugged ends of pipes 210 and 213 are provided with coupling members 215 and 216.

There is a set of additional horizontal seams 219 fabricated in the rectangular bag; each additional horizontal seam is intersected alternately with one vertical lateral seam 206 and has a gap with respect to the opposite vertical lateral seam 206. The end of the additional horizontal seam 219, which is not intersected with the lateral vertical seam 206, is intersected with a short vertical seam 220 having a gap with its upper horizontal additional seam 219.

The short vertical seams 220 have intermittent shapes.

FIG. 3A shows an isometric view of a carcass, which serves for the installation of the flexible bags with their upper and lower pipes.

It comprises vertical angle 301, horizontal upper angles 302, and horizontal lower angles 303.

Figure 3B:
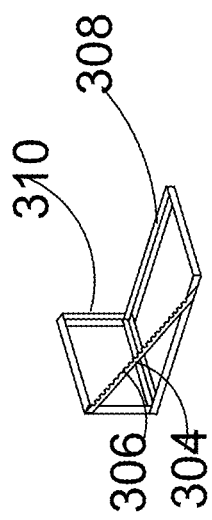
FIG. 3B and FIG. 3C are isometric views of two opposite supporting members.
Figure 3C:
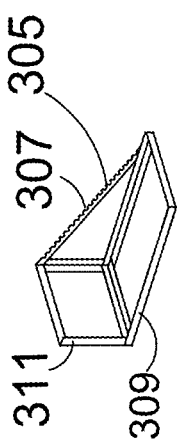

FIG. 3B and FIG. 3C are isometric views of two opposite supporting members.

They comprise supporting tilted angles 304 and 305 with recesses 306 and 307, horizontal rectangular frames 308 and 309, and vertical rectangular frames 310 and 311.

FIG. 3D is an isometric view of the carcass with its vertical angle 301, horizontal upper angles 302, the supporting tilted angles 304, and 305 with recesses 306 and 307, horizontal rectangular frames 308 and 309, and vertical rectangular frames 310 and 311.

FIG. 4 shows a manifold intended to be in fluid communication with the upper or lower pipes placed in the flexible bags installed in the carcass. It comprises a tubular header 401 with an inlet or outlet connection 402, pipe branches 403 joined with bellows sections 404, and coupling members 405.

Two ends of the tubular header are sealingly closed by plugs 406.

Figure 5A:
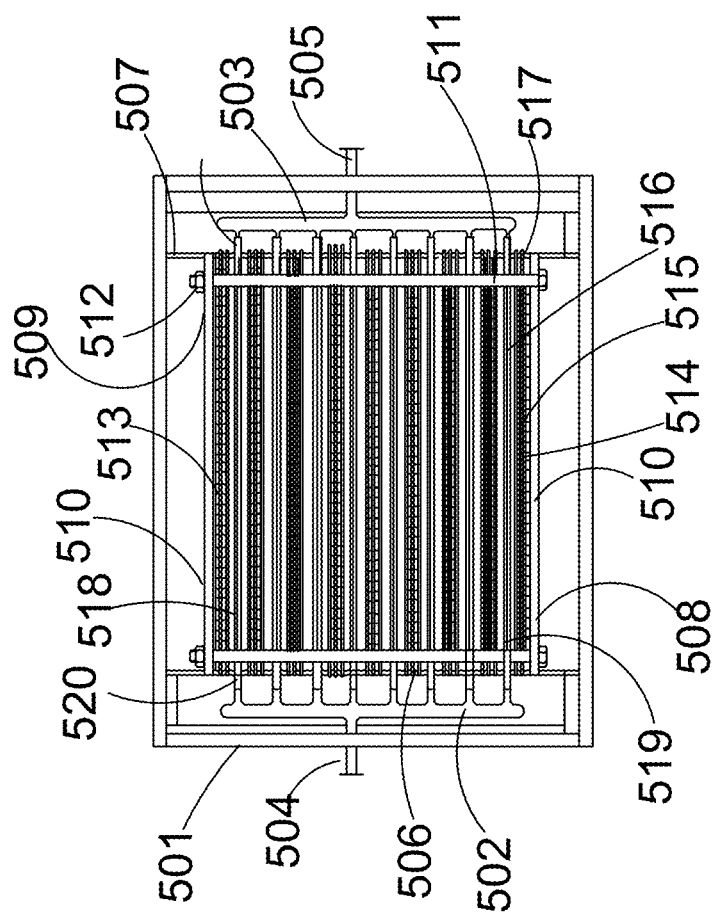
FIG. 5A shows a view from above the dry cooling tower.

FIG. 5A shows a view from above of a dry cooling tower.

It comprises upper angles 501, upper and lower manifolds with header tubes 502 and 503, inlet and outlet connections 504 and 505, bellows sections 520 of the upper manifold 502, supporting members 506 and 507 with recesses 517, restricting plates 508 and 509 with upper crossbars 510 and joining bolts 511 and nuts 512, corrugated fence nettings 513 with crossbars 514, fine nettings 515 with crossbars 516, polymer bags 518 with upper pipes 519.

Figure 5B:
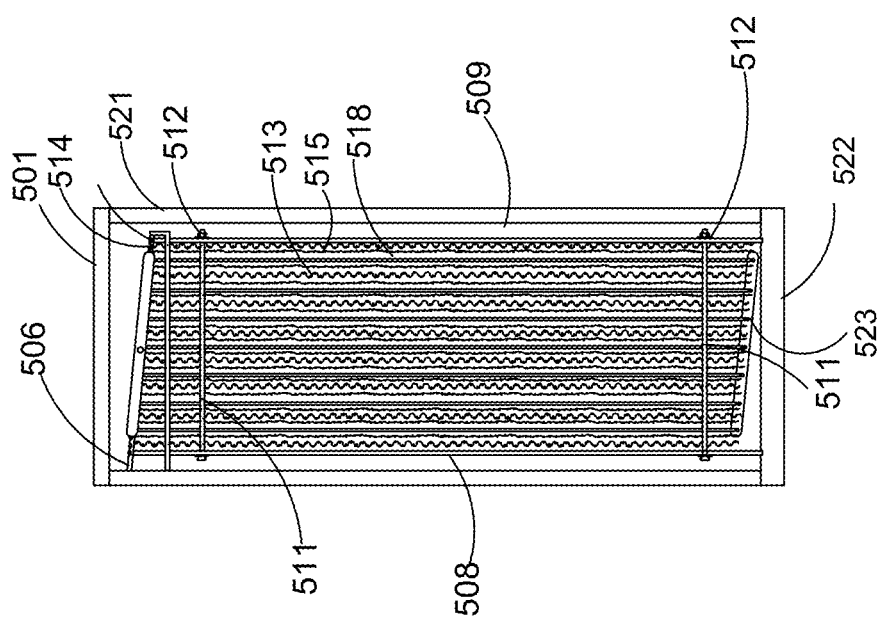
FIG. 5B shows a lateral view of the dry cooling tower without upper and lower manifolds.

FIG. 5B shows a lateral view of the dry cooling tower without upper and lower manifolds.

It comprises upper horizontal angles 501, vertical angles 521, lower horizontal angles 522, the supporting member 506 with recesses 517, the restricting plates 508 and 509 with the upper crossbars 510, and the joining bolts 511 and nuts 512, the corrugated fence nettings 513 with crossbars 514, the fine nettings 515 with crossbars 516, the polymer bags 518 with the upper pipes 519 and lower pipes 523.

Figure 5C:
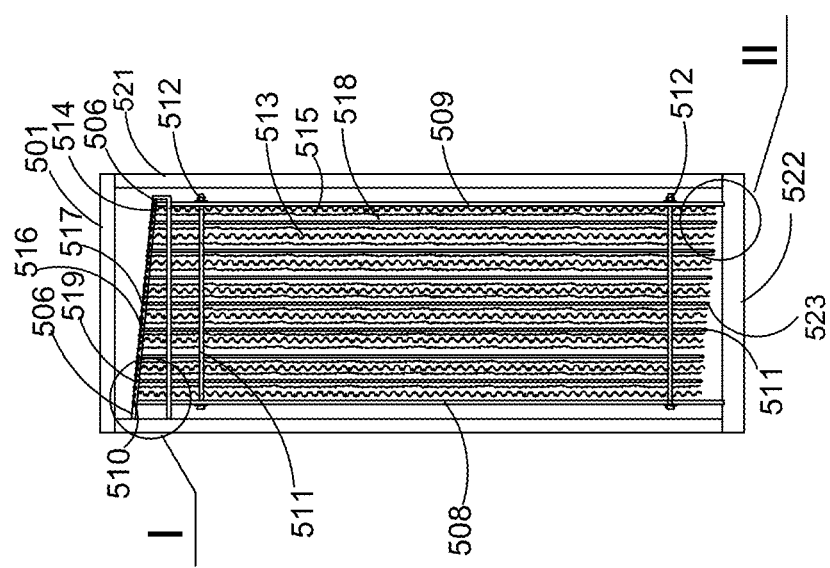
FIG. 5C shows a lateral view of the dry cooling tower without upper and lower manifolds.

FIG. 5C shows a lateral view of the dry cooling tower with upper and lower manifolds.

It comprises the upper horizontal angles 501, the vertical angles 521, the lower horizontal angles 522, the upper and lower manifolds with the header tubes 502 and 503, the bellows sections 520, the inlet and outlet connections 504 and 505, the supporting members 506 and 507 with recesses 517, the restricting plates 508 and 509 with the upper crossbars 510 and the joining bolts 511 and nuts 512, the corrugated fence nettings 513 with crossbars 514, the fine nettings 515 with crossbars 516, the polymer bags 518.

FIG. 5D and FIG. 5E are upper and lower detail sections (I and II) of the lateral view of the dry cooling tower.

FIG. 5D shows the vertical angle 521 of the carcass with the supporting member 506, with recesses 517, the restricting plate 508 with the upper crossbar 510, the corrugated fence nettings 513 with crossbars 514, the fine nettings 515 with crossbars 516, the polymer bags 518 with the upper pipe 519.

FIG. 5E shows the vertical angle 521 of the carcass, the restricting plate 509, the corrugated fence nettings 513, the fine nettings 515, and the polymer bag 518 with the lower pipe 523.

The invention claimed is:

1. A dry cooling tower comprising: a carcass of said dry cooling tower, said carcass is a rectangular parallelepiped fabricated from metal profiles;

two supporting members are installed internally on the upper sections of two opposite lateral sides of said carcass; said supporting members comprise a horizontal frame, a vertical frame joined to the horizontal frame, and an angle profile with recesses joined to both the vertical frame and the horizontal frame, wherein said angle profile is arranged diagonally between an upper corner of the vertical frame to an opposite corner of the horizontal frame;

said supporting members with corresponding supporting angle profiles are installed in the upper section of said carcass on two opposite lateral sides, with their horizontal frames aligned parallel to the horizontal plane of the carcass and their vertical frames aligned parallel to the vertical plane of the carcass; the internal space of said carcass comprises the following components, each of which is hung by placing a portion thereof within corresponding recesses of said supporting members: two opposite restricting plates, each having an upper crossbar and are provided with openings positioned to enable bolted connection at the periphery of said plates using bolts and nuts; and a plurality of flat plate heat-exchanging units arranged in parallel with spacers placed between them;

each said flat-plate heat-exchanging unit is a rectangular bag, which is formed from two identical rectangular pieces of material, said material is selected from the group consisting of polymer films, laminated foil, double-sided laminated foil or waterproof impregnated fabric; each said rectangular piece is provided with two pairs of opposite upper and lower rectangular protrusions on respective lateral sides, wherein said two rectangular pieces are overlapped and seamed by welding along respective upper horizontal edges forming an upper horizontal seam, and along respective lower horizontal edges forming a lower horizontal seam, and also along lateral edges, excluding the edges of said upper and lower protrusions, which are in parallel with the lateral sides of the rectangular bag; the upper section of said rectangular bag is provided with a first horizontal seam, which is parallel to said upper horizontal seam and positioned at a downward offset with respect to the points of intersections of the vertical edges of said rectangular polymer films with the lower horizontal edges of said upper rectangular protrusions; in such a way, said seam of said upper edges, said seams of the lower edges of said upper rectangular protrusions, and said first horizontal seam form an upper duct; said first seam has some unseamed gaps, which form openings in the inflatable state of the upper section of said rectangular bag; said first duct serves for guiding a feeding pipe within said rectangular bag; the lower section of said rectangular bag is provided with a second seam, which is parallel to said lower horizontal seam and positioned at an upward offset with respect to the points of intersections of the vertical edges of said rectangular polymer pieces with the upper horizontal edges of said lower rectangular protrusions; said second seam has some unseamed gaps; in such a way, said seam of the lower edges, said seams of the upper edges of lower rectangular protrusions, and said second horizontal seam form a lower duct; said the second seam guides a withdrawal pipe within the rectangular bag; the length of said upper and lower pipes is chosen in such a manner that their terminal sections protrude outward with respect to said upper and lower ducts; the perimeters of said upper and lower pipes conform to twice the width of said upper and lower ducts; so, said upper and lower pipes are introduced into said upper and lower ducts; the walls of said upper and lower pipes are provided with sets of openings, and one end or one terminal section of said upper pipe is sealed by an upper plug; the walls of said upper and lower pipes are provided with sets of openings; the open ends of said feeding and withdrawal pipes are joined by mechanical pipe coupling units; said upper and lower ducts are joined with said upper and lower pipes by sealing cuffs; the internal space of said obtained rectangular bag is filled with a heat transfer fluid; the terminal sections of said upper pipe are placed in said recesses of said supporting angles; there are spacers, which separate said neighboring rectangular bags; each said spacer comprises two nettings or two metal sheets with upper crossbars with their terminal sections, which are placed in said recesses, and a corrugated fence netting with an upper crossbar; said corrugated fence netting is arranged between two said nettings or two metal sheets and the terminal sections of its upper crossbar;

said restricting plates are separated from said neighboring rectangular bags by said corrugated fence netting with said upper crossbar and said netting or said metal sheet with their upper crossbars.

2. The dry cooling tower as claimed in claim 1, wherein the lower pipe serves as a feeding pipe, and the upper pipe serves as a withdrawal pipe.

3. The dry cooling tower as claimed in claim 1, wherein there is a set of additional horizontal intermittent seams fabricated in the rectangular bag; each said additional horizontal seam is intersected with one vertical lateral seam and terminate at a point short of the opposite vertical lateral seam, thereby leaving a gap at the terminal end; the terminal end of said additional horizontal seam, which is not intersected with said lateral vertical seam, is intersected with a vertical seam extending upward from said terminal end, said vertical seam being spaced below and not intersecting an upper additional horizontal seam, so as to define a gap therebetween.

4. The dry cooling tower as claimed in claim 1, wherein a fan is installed on the upper horizontal plane of the carcass.

5. The dry cooling tower as claimed in claim 1, wherein two opposite lateral sides of the metal carcass, which are perpendicular to the planes of the hung rectangular bags, are covered with covering sheets, distinct from the spacer metal sheets.

6. The dry cooling tower as claimed in claim 1, wherein two opposite lateral sides of the metal carcass, which are perpendicular to the planes of the hung rectangular bags, are covered with covering sheets distinct from the spacer metal sheets, and a fan is installed on the upper horizontal plane of the carcass.

* * * * *